(12) United States Patent
Mark et al.

(10) Patent No.: US 12,333,237 B2
(45) Date of Patent: *Jun. 17, 2025

(54) SYSTEMS AND METHODS FOR PROVIDING A VIEW OF GEOSPATIAL INFORMATION

(71) Applicant: Palantir Technologies Inc., Denver, CO (US)

(72) Inventors: Alexander Mark, New York, NY (US); Andrew Elder, New York, NY (US); Brandon Marc-Aurele, Arlington, VA (US); David Montague, East Palo Alto, CA (US); Eric Knudson, Boyds, MD (US); Eric Jeney, Washington, DC (US); Jeffrey Bagdis, Arlington, VA (US); Daniel O'Malley, Palo Alto, CA (US); Vincent Tilson, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,927

(22) Filed: Mar. 6, 2023

(65) Prior Publication Data

US 2023/0205977 A1    Jun. 29, 2023

Related U.S. Application Data

(63) Continuation of application No. 15/970,782, filed on May 3, 2018, now Pat. No. 11,599,706.

(Continued)

(51) Int. Cl.
*G06F 16/29* (2019.01)
*G06F 16/44* (2019.01)
(Continued)

(52) U.S. Cl.
CPC ............ *G06F 40/117* (2020.01); *G06F 16/29* (2019.01); *G06F 16/444* (2019.01); *H04W 4/02* (2013.01)

(58) Field of Classification Search
CPC ...... G06F 40/117; G06F 16/29; G06F 16/444; G06F 40/103; H04W 4/02
See application file for complete search history.

(56) References Cited

U.S. PATENT DOCUMENTS

| 3,747,757 A | 7/1973 | Freis et al. |
| 4,778,219 A | 10/1988 | Wilczynski et al. |

(Continued)

FOREIGN PATENT DOCUMENTS

| AU | 2012216622 | 5/2015 |
| DE | 102013222023 | 1/2015 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Etienne P Leroux
*Assistant Examiner* — Cindy Nguyen
(74) *Attorney, Agent, or Firm* — Sheppard Mullin Richter & Hampton LLP

(57) ABSTRACT

Systems, methods, and non-transitory computer readable media may provide a view of geospatial information. A user's selection of a location may be obtained. Characteristic information describing characteristics of the location may be obtained. Activities information describing activities of the location may be obtained. An interface (e.g., user interface, API) enabling presentation of a geospatial view of the activities of the location with respect to the characteristics of the location may be provided.

20 Claims, 7 Drawing Sheets

Related U.S. Application Data

(60) Provisional application No. 62/595,421, filed on Dec. 6, 2017.

(51) Int. Cl.
*G06F 40/117* (2020.01)
*H04W 4/02* (2018.01)

(56) References Cited

U.S. PATENT DOCUMENTS

| | | |
|---|---|---|
| 4,899,161 A | 2/1990 | Morin et al. |
| 4,958,305 A | 9/1990 | Piazza |
| 5,329,108 A | 7/1994 | Lamoure |
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen et al. |
| 7,375,732 B2 | 5/2008 | Arcas |
| 7,379,811 B2 | 5/2008 | Rasmussen et al. |
| 7,457,706 B2 | 11/2008 | Malero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,325,178 B1 | 12/2012 | Doyle, Jr. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,700,620 B1 | 4/2014 | Lieberman |
| 8,742,934 B1 | 6/2014 | Sarpy et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,280,618 B1 | 3/2016 | Bruce et al. |
| 9,348,880 B1 | 5/2016 | Kramer et al. |
| 9,424,545 B1 | 8/2016 | Lee |
| 9,514,205 B1 | 12/2016 | Yazicioglu et al. |
| 9,514,414 B1 | 12/2016 | Rosswog et al. |
| 9,612,723 B1 | 4/2017 | Elliot et al. |
| 9,760,606 B1 | 9/2017 | Wilczynski et al. |
| 2002/0003539 A1 | 1/2002 | Abe |
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0093344 A1 | 5/2004 | Berger et al. |
| 2004/0098236 A1 | 5/2004 | Mayer et al. |
| 2005/0031197 A1 | 2/2005 | Knopp |
| 2005/0034062 A1 | 2/2005 | Bufkin et al. |
| 2005/0080769 A1 | 4/2005 | Gemmell |
| 2005/0143602 A1 | 6/2005 | Yada et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0132767 A1 | 6/2007 | Wright et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |

(56) References Cited

U.S. PATENT DOCUMENTS

| | | |
|---|---|---|
| 2008/0010605 A1 | 1/2008 | Frank |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0119295 A1 | 5/2011 | Zaengle et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfiefle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0330055 A1 | 12/2013 | Zimmermann et al. |
| 2013/0339891 A1 | 12/2013 | Blumenberg et al. |
| 2014/0176606 A1 | 6/2014 | Narayan et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter et al. |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0227972 A1 | 8/2015 | Tang |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2016/0171630 A1* | 6/2016 | Votaw ............... G06Q 50/01 705/30 |
| 2016/0188557 A1 | 6/2016 | Spanu et al. |
| 2016/0191582 A1* | 6/2016 | Shivaram ............. H04L 65/61 709/231 |
| 2016/0334974 A1 | 11/2016 | Gray et al. |
| 2016/0357768 A1* | 12/2016 | Strong ............... G06F 16/29 |
| 2017/0154109 A1 | 6/2017 | Lynch et al. |

FOREIGN PATENT DOCUMENTS

| | | |
|---|---|---|
| EP | 0 763 201 | 3/1997 |
| EP | 2 575 107 | 4/2013 |
| EP | 2858014 | 4/2015 |
| EP | 2963595 | 1/2016 |
| GB | 2516155 | 1/2015 |
| NL | 2012778 | 11/2014 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

"Andy Turner's GISRUK 2012 Notes" <https://docs.google.com/document/d/1cTmxg7mVx5gd89lqbICYvCEnHA4QAivH414WpyPsqE4/edit?pli=1> printed Sep. 16, 2013 in 15 pages.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Barnes et al., "Viewshed Analysis", GIS-ARC/INFO 2001, <www.evsc.virginia.edu/~jhp7e/evsc466/student_pres/Rounds.pdf>.

Carver et al., "Real-Time Visibility Analysis and Rapid Viewshed Calculation Using a Voxel-Based Modelling Approach," GISRUK 2012 Conference, Apr. 11th-13th, Lancaster UK, Apr. 13, 2012, pp. 6.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

(56) References Cited

OTHER PUBLICATIONS

Chen et al., "Context-Aware Mashup for Smart Mobile Devices," 2012 IEEE Asia-Pacific Services Computing Conference Year: 2012, pp. 179-186.
Definition "Identify", downloaded Jan. 22, 2015, 1 page.
Definition "Overlay", downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Garcia et al., "A Matchmaking Algorithm for Resource Discovery in Multi-user Settings," 2014 IEEE/WIC/ACM International Joint Conferences on Web Intelligence (WI) and Intelligent Agent Technologies (IAT) Year: 2014, vol. 3, pp. 352-359.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public _ Department of Regional Planning. Planning & Zoning Information for Unincorporated La County. Retrieved Oct. 2, 2013 from http://gis.planning.lacounty.gov/GIS-NET3_Public/Viewer.html.
Gorr et al., "Crime Hot Spot Forecasting: Modeling and Comparative Evaluation", Grant 98-IJ-CX-K005, May 6, 2002, 37 pages.
Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Levine, N., "Crime Mapping and the Crimestat Program," Geographical Analysis, 2006, vol. 38, pp. 41-56.
Lin et al., "PRADA: Prioritized Random Access with Dynamic Access Barring for MTC in 3GPP LTE-A Networks," IEEE Transactions on Vehicular Technology Year: 2014, vol. 63, Issue 5, pp. 2467-2472.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," <http://www-users.cs.umn.edu/~npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Na et al., "Design of Location-based Directory Facilitator in Context-Aware Environment," 2008 10th International Conference on Advanced Communication Technology Year: 2008, vol. 3, pp. 2107-2110.

Open Street Map, "Amm's Diary: Unconnected ways and other data quality issues," http://www.openstreetmap.org/user/amm/diary printed Jul. 23, 2012 in 3 pages.
POI Editor, "How to: Create Your Own Points of Interest," <http://www.poieditor.com/articles/how_to_create_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Reibel et al., "Areal Interpolation of Population Counts Using Pre-classi_ed Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19- 20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
Tangelder et al., "Freeform Shape Matching Using Minkowski Operations," The Netherlands, Jun. 1996, pp. 12.
Thompson, Mick, "Getting Started with GEO," Getting Started with GEO, Jul. 26, 2011.
Valentini et al., "Ensembles of Learning Machines", M. Marinaro and R. Tagliaferri (Eds.): Wirn Vietri 2002, LNCS 2486, pp. 3-20.
VB Forums, "Buffer a Polygon, " Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Wikipedia, "Douglas_Peucker-Algorithms," <http://de.wikipedia.org/w/index.php?title=Douglas-Peucker-Algorithmus&oldid=91846042> printed Jul. 2011, pp. 2.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.
Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, pp. 3.
FAI Pre-Interview Communication dated May 18, 2020, issued in related U.S. Appl. No. 15/970,782 (4 pages).
Final Office Action dated Jan. 7, 2021, issued in related U.S. Appl. No. 15/970,782 (14 pages).
Non-Final Office Action dated Oct. 1, 2021, issued in related U.S. Appl. No. 15/970,782 (15 pages).
Final Office Action dated Jan. 31, 2022, issued in related U.S. Appl. No. 15/970,782 (18 pages).
Non-Final Office Action dated Jul. 5, 2022, issued in related U.S. Appl. No. 15/970,782 (17 pages).
Notice of Allowance mailed Nov. 9, 2022, issued in related U.S. Appl. No. 15/970,782 (8 pages).

* cited by examiner

SYSTEMS AND METHODS FOR PROVIDING A VIEW OF GEOSPATIAL INFORMATION

CROSS REFERENCE TO RELATED APPLICATIONS

This application is a continuation of U.S. Ser. No. 15/970,782, filed May 3, 2018, which claims the benefit under claims the benefit under 35 U.S.C. § 119(e) of U.S. Provisional Application Ser. No. 62/595,421, filed Dec. 6, 2017, the content of which is incorporated by reference in its entirety into the present disclosure.

FIELD OF THE INVENTION

This disclosure relates to approaches for providing views of geospatial information.

BACKGROUND

Under conventional approaches, information relating to a location may be collected for analysis and viewing from a variety of data sources. In general, it may be difficult for users to effectively analyze and utilize such information in a comprehensive manner and/or to understand the context of such information.

SUMMARY

Various embodiments of the present disclosure may include systems, methods, and non-transitory computer readable media configured to provide views of geospatial information. A user's selection of a location may be obtained. Characteristic information describing characteristics of the location may be obtained. Activities information describing activities of the location and surrounding area may be obtained. An interface (e.g., user interface, API) enabling presentation of a geospatial view of the activities of the location and surrounding area with respect to the characteristics of the location may be provided.

In some embodiments, the characteristics of the location may include physical objects of the location, and the activities of the location may include events or reports of the location and surrounding area. The interface may further enable presentation of formatted views of narratives for the events or the reports of the location. The formatted views of the narratives may include separation of the narratives into multiple sections.

In some embodiments, the interface may further enable tagging of a given text of a given narrative.

In some embodiments, one or more media files of the location may be obtained. The media file(s) may be associated with a position within the location. The interface may further enable presentation of a geospatial view of the media file(s) at the position within the location.

In some embodiments, the media file(s) of the location and surrounding area may be obtained through a decorator operation. The decorator operation may find and provide the media file(s) of the location. In some embodiments, the decorator operation may find the media file(s) using a federated search. The federated search may include a search of one or more external data sources.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
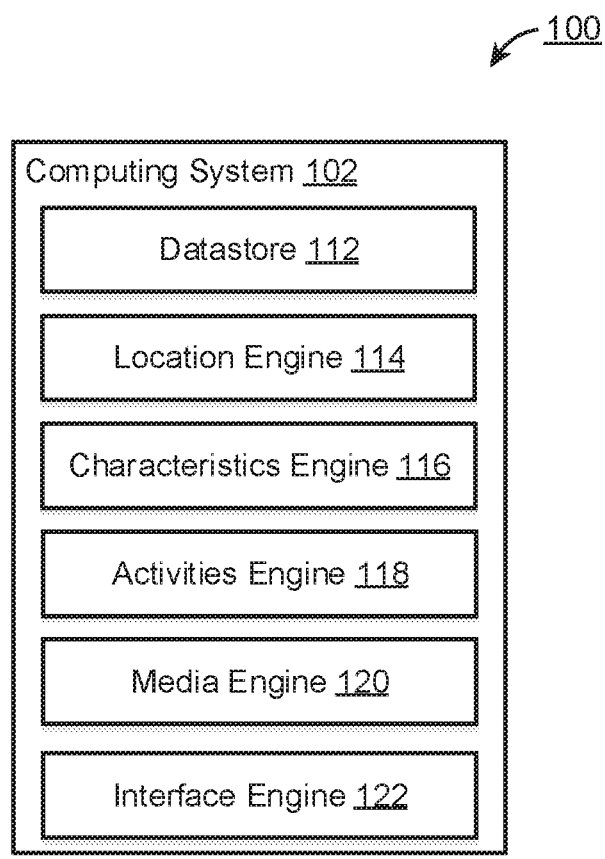
FIG. 1 illustrates an example environment for providing information, in accordance with various embodiments.

A claimed solution rooted in computer technology overcomes problems specifically arising in the realm of computer technology. In various implementations, a computing system may obtain a user's selection of a location. For example, the computing system may obtain a user's selection of a particular location (e.g., defined by particular longitude and latitude, or a particular address), a user's selection of a map for the particular location, a user's selection of an object located at/relating to a particular location, and/or other selection of a particular location. The computing system may obtain characteristic information describing characteristics of the location and activities information describing activities of the location and surrounding area. The characteristics of the location may include physical objects (e.g., persons, vehicles, buildings) of the location and the activities of the location and surrounding area may include events or reports (e.g., activity report) of the location and surrounding area.

The computing system may provide an interface that enables presentation of a geospatial view of the activities of the location with respect to the characteristics of the location. For example, the computing system may provide an interface that provides a map of a location augmented with characteristics of the location, with activities of the location and surrounding area marked at their corresponding positions within the map.

In some embodiments, the interface may further enable presentation of formatted views of narratives for the events or the reports of the location. The formatted views of the narratives may include separation of the narratives into multiple sections. For example, the interface may enable presentation of a formatted view of a narrative for an activity report where the narrative is broken into different sections. Other types of formatting (e.g., ALL-CAPS to sentence caps, line/paragraph adjustments) may be used. The interface may also enable tagging of a given text of a given narrative. The tagged text may be converted into a property, a link, and/or other fields associated with the event/report/location. The interface may further suggest one or more text of a given narrative to be tagged/converted.

In some embodiments, the computing system may obtain one or more media files of the location. The media file(s) may be associated with a position within the location, and the interface may further enable presentation of a geospatial view of the media file(s) at the position within the location. For example, based on a user's selection of a particular media file(s), the location at which the media file(s) was captured/the location with which the media file(s) is related may be indicated on a map.

In some embodiments, the one or more media files of the location may be obtained through a decorator operation. The decorator operation may find and provide (e.g., load) the one or more media files of the location. The decorator operation may find the one or more media files using a federated search, which may include a search of one or more external data sources.

The approach disclosed herein enables customized views of information. Objects having geospatial properties may be displayed within their corresponding positions in a location to provide geospatial context of the objects. Narratives of events/reports may be formatted to facilitate users' use or analysis of the narratives.

FIG. 1 illustrates an example environment 100 for providing views of geospatial information, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The environment 100 may also include one or more datastores that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a location engine 114, a characteristics engine 116, an activities engine 118, a media engine 120, and an interface engine 122. The datastore 112 may include structured and/or unstructured sets of data that can be divided/extracted for provisioning when needed by one or more components of the environment 100. The datastore 112 may include one or more databases. The datastore 112 may include different data analysis/processing modules that facilitate different data analysis/processing tasks, and/or other information to be used in the environment 100. While the computing system 102 is shown in FIG. 1 as a single entity, this is merely for ease of reference and is not meant to be limiting. One or more components/functionalities of the computing system 102 described herein may be implemented in a single computing device or multiple computing devices.

In various embodiments, the location engine 114 may be configured to obtain a user's selection of a location. A location may refer to a particular place or an area. A user's selection of a location may include the user's selection of a particular location or a user's selection of an object associated with a particular location or a position within a particular location. For example, the location engine 114 may obtain a user's selection of a location based on a user's selection of a particular location defined by particular longitude and latitude or a particular address, a user's selection of a map for the particular location, a user's selection of an object located at/relating to a particular location, and/or other selection of a particular location. In some embodiments, the location engine 114 may obtain a user's selection of a location based on a user's interaction with a user interface/application. For example, a user interface/application may provide option(s) for a user to enter a particular location for selection via key entry or choose a particular location for selection via interaction with a map. Other selections of locations are contemplated.

In various embodiments, the characteristics engine 116 may be configured to obtain characteristic information describing characteristics of the location selected by the user. In some embodiments, the characteristic information may further include information describing an area (or region) surrounding the location selected by the user or information describing one or more portions of the surrounding area. Obtaining characteristic information may include accessing, acquiring, analyzing, determining, examining, loading, locating, opening, receiving, retrieving, reviewing, storing, and/or otherwise obtaining the characteristic information. For example, the characteristics engine 116 may, based on the location selected by the user, search for and/or obtain characteristic information describing characteristics of the location. Characteristic information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Characteristic information may be obtained from one or more databases (e.g., the datastore 112). Characteristic information may be stored within a single file or across multiple files. For example, characteristic information for a location may have been ingested into a database (e.g., the datastore 112) as one or more objects, and the characteristics engine 116 may retrieve the object(s) to obtain the characteristics information.

Characteristics of a location may refer to features and/or qualities of a location. For example, characteristics of a location may include physical features and/or physical qualities of a location, such as physical objects (e.g., persons, vehicles, buildings) of a location. Characteristics of a location may include permanent features and qualities and/or temporary features and qualities. For example, characteristics of a location of a may include different persons and/or vehicle at different times. Characteristics of a location may include same physical traits (e.g., altitude) at different times. Other types of characteristics of a location are contemplated.

In some embodiments, the characteristics engine 116 may obtain characteristic information describing characteristics of interest of a location. For example, the characteristics engine 116 may obtain, for a location, characteristics that are of interest to one or more users and/or one or more projects. That is, the characteristics engine 116 may obtain characteristic information describing different characteristics of a location for different users/projects. The characteristics engine 116 may obtain characteristic information describing characteristics of a location that are of interest to a user/project.

In various embodiments, the activities engine 118 may be configured to obtain activities information describing activities of the location selected by the user. In some embodiments, the activities information may further describe activities in an area (or region) surrounding the location selected by the user or activities in one or more portions of the surrounding area. Obtaining activities information may include accessing, acquiring, analyzing, determining, examining, loading, locating, opening, receiving, retrieving, reviewing, storing, and/or otherwise obtaining the activities information. For example, the activities engine 118 may, based on the location selected by the user, search for and/or obtain activities information describing activities of the location. Activities information may be obtained from one or more storage locations. Activities information may be obtained from one or more databases (e.g., the datastore 112). Activities information may be stored within a single file or across multiple files. For example, activities information for a location may have been ingested into a database (e.g., the datastore 112) as one or more objects, and the activities engine 118 may retrieve the object(s) to obtain the activities information.

Activities of a location (and surrounding area) may refer to occurrences of conditions or things within a location (and surrounding area), and/or information relating to occurrences of conditions or things within a location (and surrounding area). For example, activities of a location and surrounding area may include events or reports of events within a location and area surrounding the location. Activities of a location may include ongoing activities, periodic activities, recurring activities, singular activates, and/or other activities. Activities of a location may include activities that have occurred, activities that are occurring, and/or activities that will occur in the future. For example, activities of a location may include a future event that is scheduled to occur at the location and/or a report (e.g., activity report) regarding a past event at the location. Events/reports of events of a location may be described using one or more narratives. In some embodiment, a narrative of an event/report may lack formatting. In some embodiments, a narrative of an event/report may be formatted and/or separated into different sections for presentation. Other types of activities of a location are contemplated.

In some embodiments, the activities engine 118 may obtain activities information describing activities of interest for a location. The activities information may further describes activities of interest in the surrounding area. For example, the activities engine 118 may obtain, for a location, activities that are of interest to one or more users and/or one or more projects. That is, the activities engine 116 may obtain activities information describing different activities of a location (and surrounding area) for different users/projects. The activities engine 118 may obtain activities information describing activities for a location (and surrounding area) that are of interest to a user/project.

In various embodiments, the media engine 120 may be configured to obtain one or more media files of a location. Obtaining a media file may include accessing, acquiring, analyzing, determining, examining, loading, locating, opening, receiving, retrieving, reviewing, storing, and/or otherwise obtaining the media file. A media file may be obtained from one or more storage locations. For example, the media engine 120 may, based on the location selected by the user, search for and/or obtain media files of the location. A media file may be obtained from one or more databases (e.g., the datastore 112). For example, a media file for a location may have been ingested into a database (e.g., the datastore 112) as one or more objects, and the media engine 120 may retrieve the object(s) to obtain the media file.

A media file may refer to an electronic file defining one or more media, such as an image file, an audio file, a video file, a document file, a presentation file, and/or other files. A media file may be associated with one or more positions within the location. That is, a media file may be associated with position(s) where the media file was captured, position(s) in which a subject of the media file is located, position(s) with which the media file has been tagged, and/or other positions.

In some embodiments, the media engine 120 may obtain media file(s) of interest for a location. For example, the media engine 120 may obtain, for a location, media files that are of interest to one or more users and/or one or more projects. That is, the media engine 120 may obtain different media files of a location for different users/projects. The media engine 120 may obtain particular media/media type for a location that are of interest to a user/project.

In some embodiments, a media file of a location may be obtained through one or more decorator operations. A decorator operation may refer to an operation that finds information for an object and provides the information for the object. For example, an object corresponding to a building may have address information for the building but may lack longitude and latitude information for the building. A decorator operation may use the address information of the building object to determine/retrieve the longitude and latitude information for the building object, and provide the longitude and latitude information for the building object. For example, the longitude and latitude information for the building object may be obtained and displayed for the building object when the building object is loaded into a map. Decorating objects with particular information may be expensive. For example, decorating all building objects with longitude and latitude information may require consumption of large amounts of processing, time, and/or memory resources. Rather than decorate all building objects with longitude and latitude information, a decorator operation may be used to obtain and provide longitude and latitude information for a particular building object when the particular building object is loaded for view (e.g., in a map). Such approaches may provide for resource savings in decorating objects with information.

A decorator operation may find and provide (e.g., load) media file(s) corresponding to a location. For example, the decorator operation may use one or more properties of a location, such as geo-location and/or identifier, to find related media files and provide them for presentation. In some embodiments, a decorator operation may find the media files using a federated search. A federated search may include search of multiple searchable resources. A search request for media files may be distributed to multiple search engines, databases, and/or other searchable resources and the results of the searches may be aggregated for presentation. A federated search may include a search of one or more external data sources. That is, a federated search may search data sources external to the computing system 102 for media files.

The use of federated searching may provide for identification and provision of external media items (e.g., media items not stored in the datastore 112). Media files may be large and local storage of media files for different locations may consume large amounts of resources. Importing media files into different projects for different locations may also consume large amounts of resources. Rather than locally storing/importing media files, the media files may be identified and loaded from external data sources when needed. Such provision of external media files may reduce resource consumption by the computing system 102.

In various embodiments, the interface engine 122 may be configured to provide one or more interfaces. The interface(s) may include application program interface(s) and/or user interface(s). The interface(s) may enable presentation of a geospatial view of the activities of the location and surrounding area with respect to the characteristics of the location. The interface engine 122 may provide one or more APIs that may be used by users/computing systems to view (or access) positions of activities with respect to positions of different characteristics of a location. For example, the interface engine 122 may provide an interface that provides a map of a location augmented with characteristics of the location and/or with activities of the location and surrounding area marked at their corresponding positions within the map. Visuals, such as icons or other visual representation, representing activities and/or characteristics may appear on a map based on the geo-locations of the activities/characteristics.

Providing a geospatial view of the activities of the location and surrounding area with respect to the characteristics of the location may enable users to review the activities based on their corresponding positions and analyze information based on the respective positions among activities/characteristics. For example, visuals representing activities/events/reports may be presented on a map of a location and surrounding area based on the positions of the activities/events/reports within the location and surrounding area. Such presentation of visuals may enable users to review the activities/events/reports based on their positions with respect to characteristics (e.g., buildings, objects, terrain) of the location and surrounding area and/or other activities/events/reports of the location and surrounding area.

In some embodiments, the interface(s) provided by the interface engine 122 may enable presentation of a geospatial view of media file(s) at corresponding position(s) within the location. A media file may be associated with one or more positions within the location. For example, a media file may be associated with position(s) where the media file was captured, position(s) in which a subject of the media file is located, position(s) with which the media file has been tagged, and/or other locations. Based on a user's selection of a particular media file, the associated position of the particular media file may be indicated in the visual presentation of the location (e.g., on a map). For example, the position at which the particular media file was captured/the position with which the particular media file is related may be indicated on a map of the location. Selection of a particular media file by the user may include the user clicking on the particular media file through a user interface, the user clicking on an option for the particular media file through a user interface, the user hovering over the particular media file in a user interface, and/or other selection of the particular media file. Indication of the associated position on a map may include display of a visual indicator (e.g., icon, shape) at the associated position. In some embodiments, indications of the associated positions on a map may be configured differently. For example, the indications may have different sizes and/or shapes to represent different extents/areas of the associated positions.

In some embodiments, the interface(s) may enable presentation of formatted views of narratives for the events or the reports of the location. That is, a narrative of an event/report of the location may not be formatted and the interface(s) may provide for views of a formatted narrative. A narrative may include text, properties, and/or other information relating to an event/report and the interface(s) may provide a formatted view of the narrative separated into multiple sections, such as a header section, a source section, a comment section, an administrative section, a contact section, and/or other sections. For example, the interface(s) may enable presentation of a formatted view of a narrative for an activity report where the narrative is broken into different sections. In some embodiments, texts of the narrative may be collapsed inside the different sections and users may view the corresponding text by expanding the individual sections.

In some embodiments, a formatted view of a narrative may include formatting of text contained within the narrative. Formatting of text contained within the narrative may provide a user-friendly view of the narrative. For example, the narrative may include unformatted text, such as blob of text, text provided as lower-case/ALLCAPS text, text not utilizing different typography to highlight certain information within the narrative, and/or text without spacing that allows users to easily distinguish groupings/sets of information conveyed by the text. The text of the narrative may be formatted by changes in capitalization, typography, and/or the spacing of the text.

In some embodiments, changing the capitalization may include changing lower-case/ALLCAPS text to sentence case format—capitalizing the first letter of each sentence rather than every letter. In some embodiments, using sentence case format may include capitalizing certain terms which are normally capitalized (e.g., first letters in names, letters in acronyms). Other changes in capitalization of the narrative are contemplated.

In some embodiments, changing the typography may include changing one or more of color, font, size, italics, bold, underline, and/or other typography of letters/words/terms within the narrative. For example, particular terms of importance/potential importance in the narrative may be called out for view by users by changing color, font, size, italics, bold, underline, and/or other typography of the terms. In some embodiments, the typography of different letters/words/terms may be changed differently. For example, letters/words/terms conveying different information/types of information (e.g., currency amounts, dates, physical/email addresses, phone numbers) may be changed differently (e.g., different color, different font, different size). Other changes in typography of the narrative are contemplated.

In some embodiments, changing the spacing may including adding/removing/modifying spacing within the narrative. For example, a narrative relating to an event may separate different types of information using different spacing (e.g., double spacing, triple spacing). The different types of spacing may be changed to indicate separation of information/types of information. For example, quadruple spacing between groupings of texts may be replaced with Tabs while triple spacing between groupings of texts may be replaced with paragraph breaks. As another example, particular spacing may be changed within the narrative based on a particular letter/word/term within the unstructured information (e.g., adding a paragraph break following/preceding a particular term). Particular spacing may be changed within the narrative based on a particular combination of letters/words/terms within the unstructured information (e.g., adding a Tab following/preceding a particular combination of words, adding a Tab between particular terms). Other changes in spacing within the narrative are contemplated.

In some embodiments, formatting of the narrative may be changed/determined based on user input. For example, different formatting options (e.g., capitalization, typography, spacing) for the narrative may be provided to users (e.g., via user interface, API) and the users may select the particular formatting desired for the narrative. The narrative may be formatted in accordance with the formatting option(s) selected by the users. In some embodiments, the type of formatting performed on a narrative may be selected using on one or more machine learning techniques. Other types of formatting of narratives are contemplated.

In some embodiments, letters/words/terms may be formatted based on tagging of the letters/words/terms. For example, certain letters/words/terms may be tagged as a key term, tagged with certain properties associated with formatting, and/or otherwise tagged. Such letters/words/terms may be formatted (e.g., highlighted) to distinguish them from other text of the narrative. In some embodiments, the interface(s) may provide a view of a list of tagged text. Users may interact with the list of tagged text to see additional information about the tagged text. For example, users may click on a tagged text or hover over a tagged text to see the properties of the tagged text.

In some embodiments, the interface(s) may enable tagging of one or more texts of a narrative. The tagged text may be converted into a property, a link, and/or other fields associated with the event, the report, and/or the location. The interface(s) may enable users to select one or more text of a narrative and provide options for users to tag the selected text. For example, users may use the interface(s) to highlight a given text, right click on the highlight to see options for tagging the text, and add parameters associated with the selected tagging option. For instance, users may use the options to tag a text as a property (e.g., of the narrative, of an object) and the interface(s) may provide options for the users to input the parameters of the property.

In some embodiments, the interface(s) may suggest one or more text of a given narrative to be tagged/converted. Particular texts may be suggested for tagging based on historical tagging of terms, machine learning, and/or other algorithms. For example, distinctive text that represents a value of interest (e.g., geolocation using military grid reference system) may be suggested for tagging. Such text may be difficult to see and highlighting may enable users to more easily locate the text.

FIGS. 2-5 illustrate example user interfaces 200, 300, 400, 500 for providing information, in accordance with various embodiments. In various embodiments, the user interfaces 200, 300, 400, 500 may be accessed through a software application running on a computing device (e.g., computers, mobile phones, tablets, etc.) that includes one or more processors and memory. For example, the user interfaces 200, 300, 400, 500 may be accessible through a web browser. In another example, the user interfaces 200, 300, 400, 500 may be provided through a data analysis application. In yet another example, the user interfaces 200, 300, 400, 500 may be provided as a service over a network (e.g., software as a service). Depending on the computing device, the user may be able to interact with the user interfaces 200, 300, 400, 500 using various input devices (e.g., keyboard, mouse, etc.) and/or touch gestures. The user interfaces 200, 300, 400, 500 are provided merely as examples and, naturally, the arrangement and configuration of such user interfaces can vary depending on the implementation. Thus, depending on the implementation, the user interfaces 200, 300, 400, 500 may include additional features and/or alternative features. The user interfaces 200, 300, 400, 500 may include/enable one or more functionalities of the interface(s) described with respect to the computing system 102/components of the computing system 102.

Figure 2:
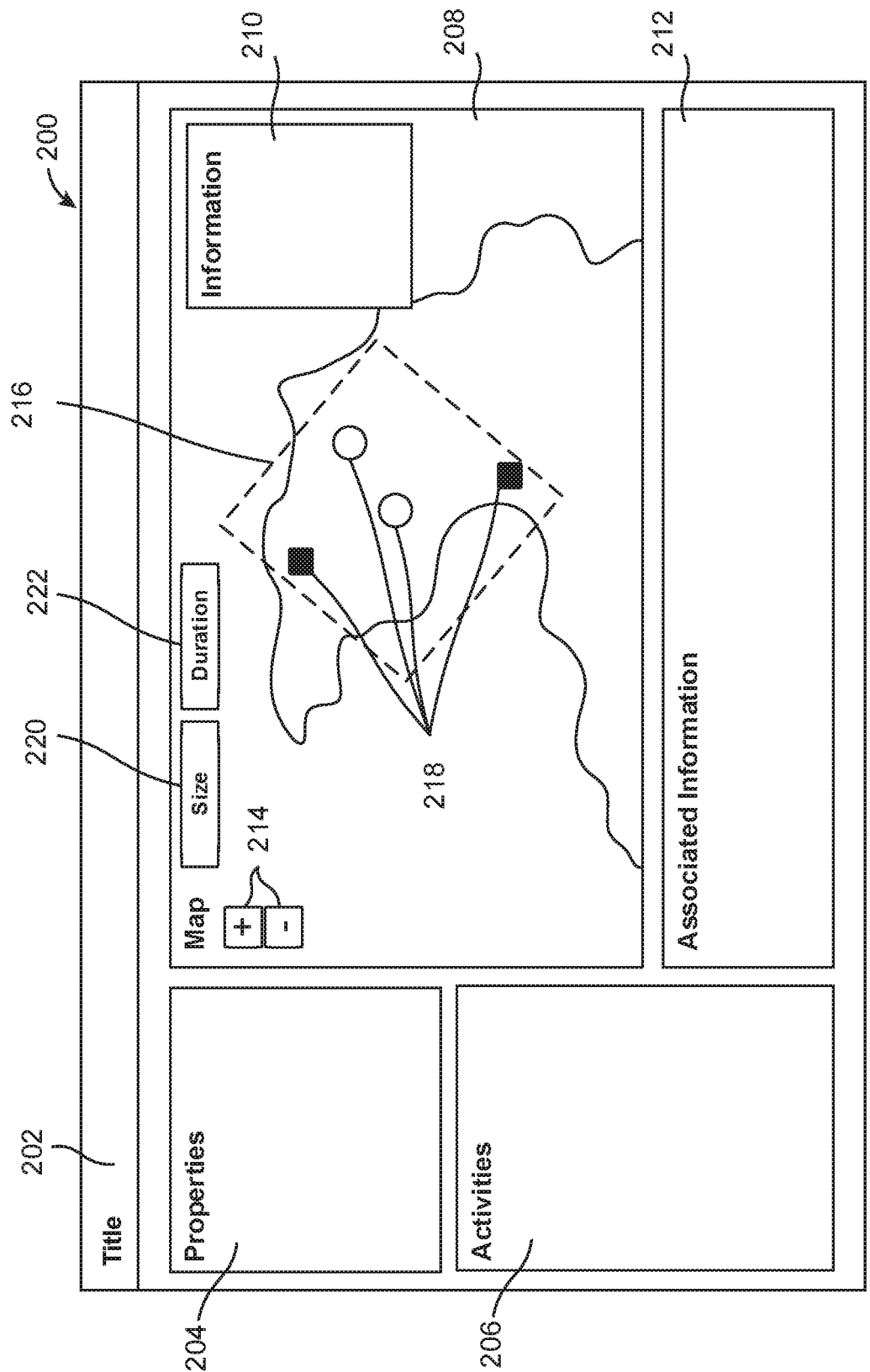
FIG. 2 illustrates an example interface for providing information, in accordance with various embodiments.

Referring to FIG. 2, the user interface 200 may include a title section 202. The title section 202 may provide title information relating to accessed information. For example, the title section 202 may provide information relating to a title/name of a document/file and/or a identifier of a location. A properties section 204 may provide information relating to properties of a location and/or other information. For example, the properties section 204 may list activities of a location, activities of area surrounding the location, properties of such activities, characteristics of a location, properties of such characteristics, and/or other information regarding a location. An activities section 206 may provide information relating particular activities of a location and/or area surrounding the location. For example, the activities section 206 may provide information relating to activities selected by a user (e.g., via interaction with the user interface 200), activities of interest in the location, and/or recent activities of the location. Users may interact with the listing of activities within the activities section 206 to view additional information regarding the activities. For example, an activity report of the location may be listed in the activities section 206 and users may see additional information regarding the activity report by selecting it in the activities section 206.

A viewing section 208 may provide a visual view of a location. For example, the viewing section 208 may provide a map of a location. The viewing section 208 may provide a geospatial view of the activities of a location with respect to the characteristics of the location. Such a view may include a map of a location augmented with characteristics of the location, with activities of the location marked at their corresponding positions within the map. For example, icons 218 may represent different activities and/or characteristics, and the icons 218 may be displayed in the viewing section based on their corresponding positions within the map. Such a view of activities and characteristics of a location may enable users to understand their context. For example, users may use the display of icons 218 to understand where an event occurred with respect to objects (e.g., persons, vehicles, building) in a location. In some embodiments, the viewing section 208 may provide a visual view of one or more portions of area surrounding the location.

The viewing section 208 may include zoom options 214 to change the extent of the map displayed within the viewing section 208. The viewing section 208 may include an information section 210 that provides detailed information regarding a location. For example, the information section 210 may provide information relating to particular properties of the location, nearby activities, nearby characteristics, and/or other information. The information displayed within the information section 210 may change based on changes in the zoom of the map and/or based on user's selection of a boundary for which information is to be displayed. For example, users may mark a boundary 218 within the viewing section 208 and the information displayed in the information section 210 may be restricted to information relating to objects within the boundary 218. In some embodiments, presentations of particular activities and/or characteristics of the location within the viewing section may similarly be restricted to the boundary 218. Other shapes and sizes of such boundaries are contemplated.

The viewing section 208 may include a size option 220. The size option 220 may enable users to determine the extent of a location displayed within the viewing section 208. For example, users may use the size option 220 to change the extent of a location displayed within the viewing section 208 from 500 meters to 50 meters. The size option 220 may be used in conjunction with or in place of the zoom options 214.

The viewing section 208 may include a duration option 222. The duration option 222 may enable users to determine the duration of time for which information regarding a location is displayed on the user interface 200. For example, users may use the duration option 222 to change the duration of time for which information regarding a location is displayed from the last 30 days to the last 5 days, to the present day, or other times, and/or to include information regarding events that are set to occur within the next 30 days. In some embodiments, the viewing section 208 may include a dynamic presentation of information where the positions of characteristics and/or activities of the location changes with time and allows users to play the changes in the characteristics and/or activities of the location.

The user interface 200 may include an associated information section 212. The associated information section may display information associated with a location, information associated with a characteristics of a location, information associated with an activities of a location, and/or other information about a location. The associated information section 212 may identify applications/application assets which uses the location being displayed within the viewing section 208. For example, the associated information section 212 may identify files of a mapping application that includes the location displayed within the viewing section 208. The associated information section 212 may display other information associated with a location, such as a listing of media files of the location.

Figure 3:
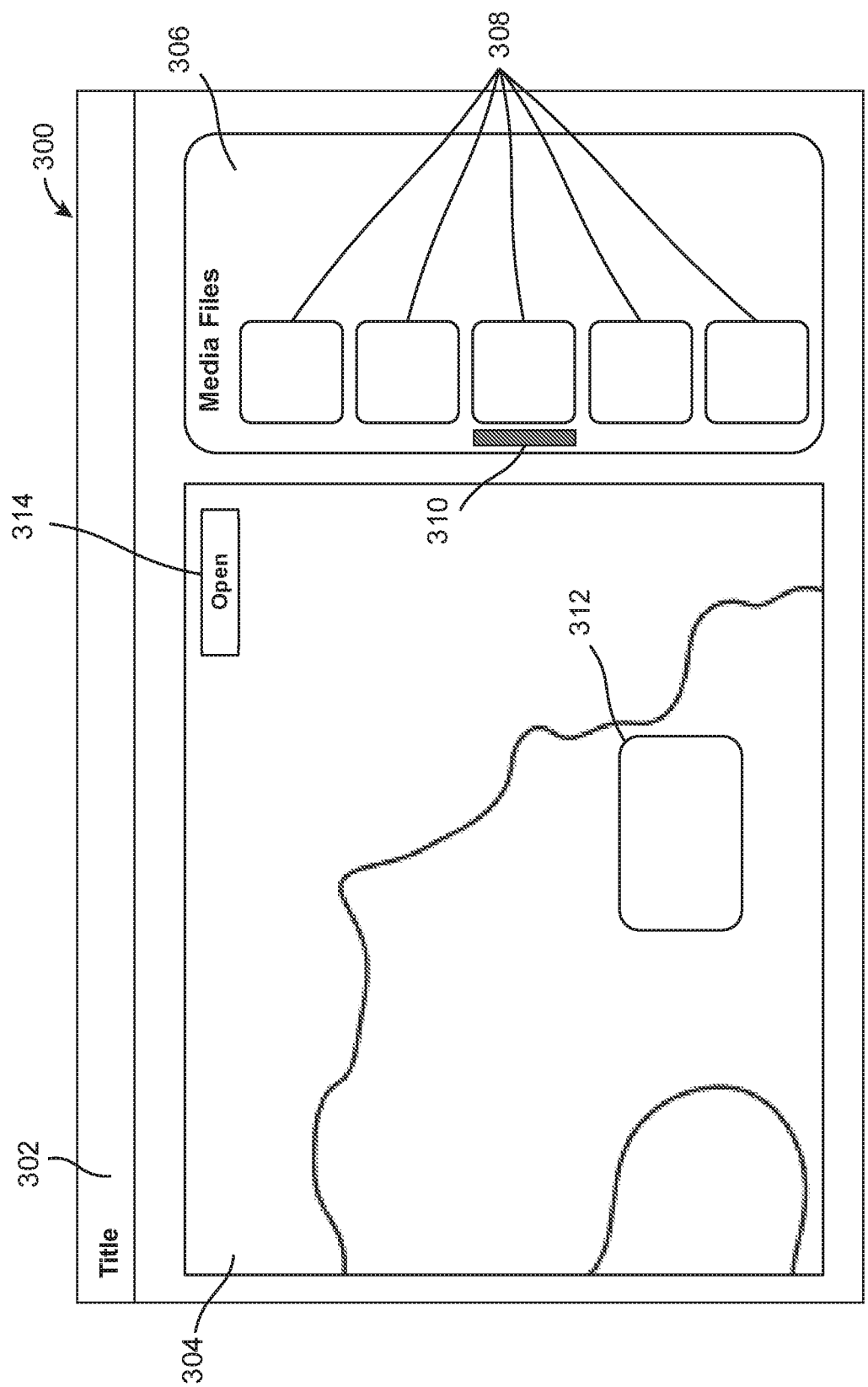
FIG. 3 illustrates another example interface for providing information, in accordance with various embodiments.

Referring to FIG. 3, the user interface 300 may include a title section 302. The title section 302 may provide title information relating to accessed information. For example, the title section 302 may provide information relating to a title/name of a document/file and/or a identifier of a location. A viewing section 304 may provide a visual view of a location. For example, the viewing section 304 may provide a map of a location. The viewing section 304 may provide a geospatial view of the activities of a location with respect to the characteristics of the location. Such a view may include a map of a location augmented with characteristics of the location, with activities of the location marked at their corresponding positions within the map. In some embodiments, the viewing section 304 may provide a visual view of one or more portions of area surrounding the location.

The user interface 300 may include a media files section 306. The media files section 306 may provide a view of media files 308 of the location. Users may interact with the media files section 306 to view the media files 308 and/or to see information about the media files 308. For example, users may select a particular media file within the media files section 306 and the selection of the particular media file may be shown via an indicator 310. The media files 308 may be associated with one or more positions within the location. That is, media files 308 may be associated with position(s) where the respective media file was captured, position(s) in which subject of the media files 308 is located, position(s) with which the media files 308 has been tagged, and/or other positions. Based on users' selection of a particular media file, the associated position of the particular media file may be shown via an indicator 312. In some embodiment, a preview of the particular media file may be shown within the indicator 312. In some embodiment, the particular media file may be played within the indicator 312. In some embodiments, the particular media file may be played within a separate application, such as a media player and/or users may be directed to a provider of the particular media file to view the particular media file. For example, users may be directed to a media player and/or a media browser hosted by the provider of the particular media file. In some embodiments, users may select multiple media items within the media files section 306 and the viewing section 304 may include multiple indicators for the selected media items displayed at their corresponding positions.

The user interface 300 may include an open option 314. The open option 314 may enable users to open the location viewed within the viewing section 304 in another application. For example, users may use the open option 314 to open the location viewed within the viewing section 304 in a mapping application. In some embodiments, the mapping application may create a new file for the location based on users' use of the open option 314. In some embodiments, the mapping application may open an existing file for the location based on users' use of the open option 314. If multiple files exist for the location, the mapping application may prompt users to choose one of the existing files.

Figure 4:
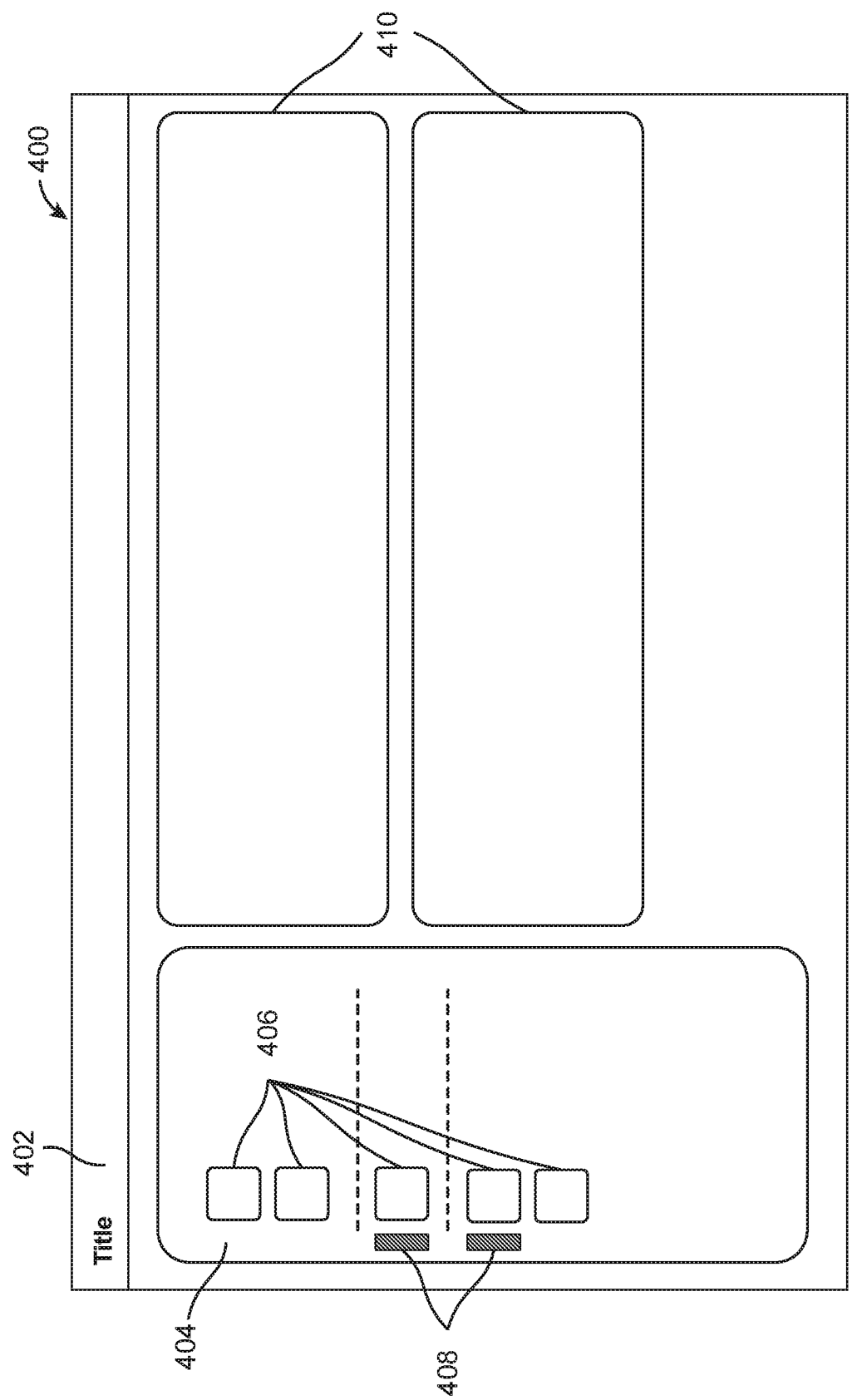
FIG. 4 illustrates yet another example interface for providing information, in accordance with various embodiments.

Referring to FIG. 4, the user interface 400 may include a title section 402. The title section 402 may provide title information relating to accessed information. For example, the title section 402 may provide information relating to a title/name of a document and/or a identifier of a location. A list section 404 may provide a listing of activities and/or characteristics of a location. The list section 404 may provide a listing of activities and/or characteristics of one or more portions of area surrounding the location. For example, the list section 404 may provide a listing of events and/or reports of a location. The events and/or reports may be individually separated and represented by visuals, such as icons 406. The list section 404 may provide the listing in a chronological order, alphabetical order, and/or other orders. The list section 404 may provide a listing of recent activities and/or characteristics of a location.

Users may interact with the list section 404 to view the events and/or report, and/or see other information about the events and/or report. For example, users may select two particular events/reports within the list section 404 and the selections of the particular events/reports may be shown via indicators 408. Responsive to users' selection, the user interface 400 may display information blocks 410. Individual information blocks 410 may correspond to individual events/reports selected by users. Information blocks 410 may display information about the selected events/reports, such as narratives of the selected events/reports and/or maps of corresponding locations/positions. In some embodiments, the maps displayed within the information blocks 410 may be interactive. That is, users may interact with the map to see additional/different information. In some embodiments, the information displayed within the information blocks 410 may be formatted.

Figure 5:
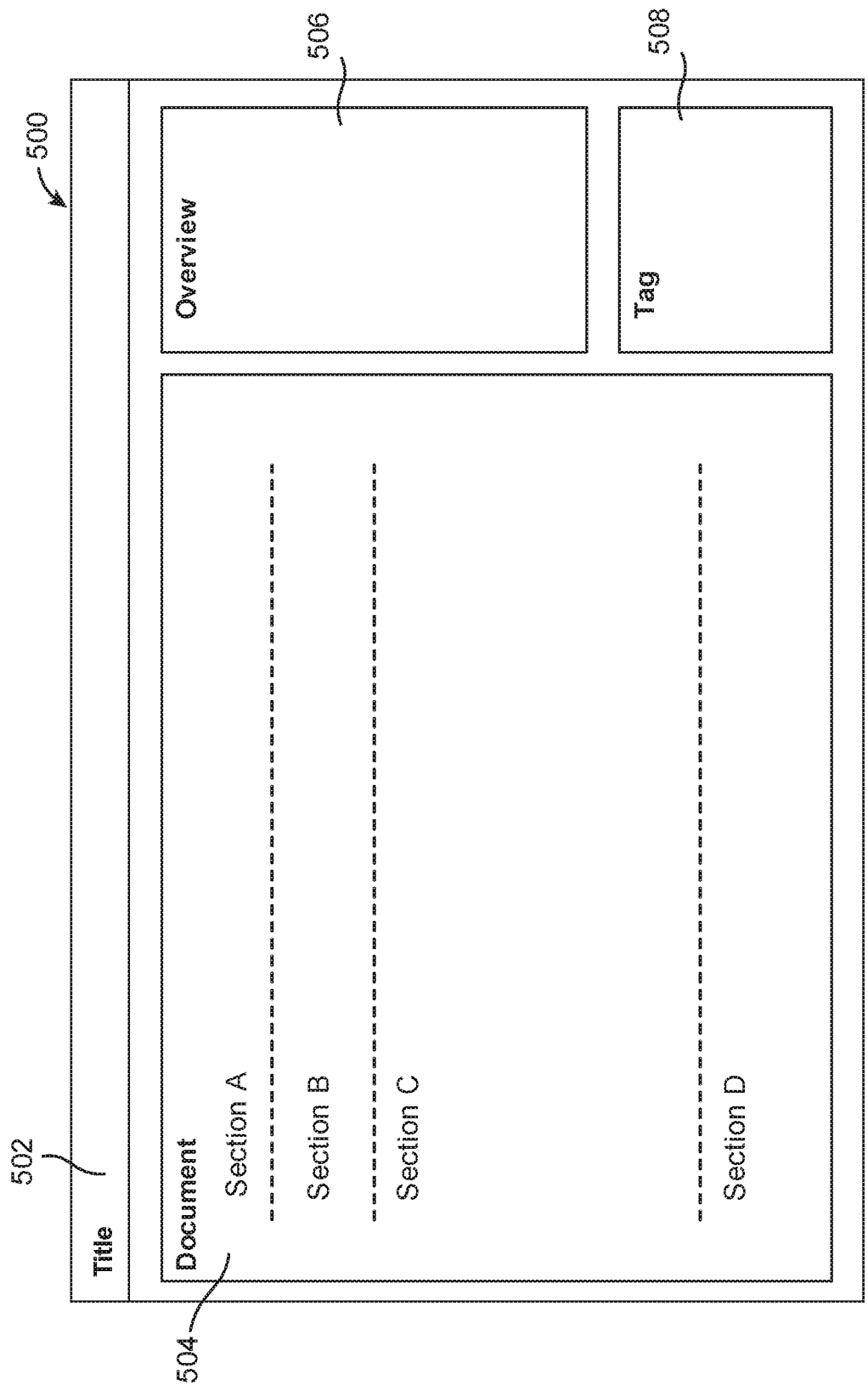
FIG. 5 illustrates yet another example interface for providing information, in accordance with various embodiments.

Referring to FIG. 5, the user interface 500 may include a title section 502. The title section 502 may provide title information relating to accessed information. For example, the title section 502 may provide information relating to a title/name of a document and/or a identifier of a location. The user interface 500 may include a document section 504. The document section 504 may provide textual information of an activity and/or a characteristic of a location, and/or other information about a location. The document section 504 may provide textual information of an activity and/or a characteristic of area surrounding the location, and/or other information about the surrounding area. For example, the document section 504 may display a narrative of an activity report of a location. The document section 504 may provide a formatted view of the narrative, such as separation of the narrative into multiple sections and/or formatting of text contained within the narrative. The text of the narrative may be formatted by changes in capitalization, typography, and/or the spacing of the text.

For example, the document section 504 may present a formatted view of a narrative for an activity report where the narrative is broken into four different sections (Sections A, B, C, D). The texts of the narrative may be collapsed inside different sections and users may view the corresponding text by expanding the individual sections. For example, a user may have selected the Section C for expansion and the text of the narrative corresponding to the Section C may be displayed within the document section under Section C.

The user interface 500 may include an overview section 506. The overview section 506 may display properties of accessed information, such as properties of an activity report. The overview section 506 may display other related information, such as a map view of a location corresponding to the activity report.

The user interface 500 may include a tag section 508. The tag section 508 may list letters/words/terms which have been tagged. For example, the tag section 508 may list letters/words/terms which have been tagged as a key term, tagged with certain properties, and/or otherwise tagged. Users may interact with the tag section 508 to view information relating to tags, such as properties of different tags or to highlight text corresponding to the tags within the document section 504. Users may interact with the tag section 508 to change one or more tags, such as by adding a tag, removing a tag, and/or modifying a tag.

Figure 6:
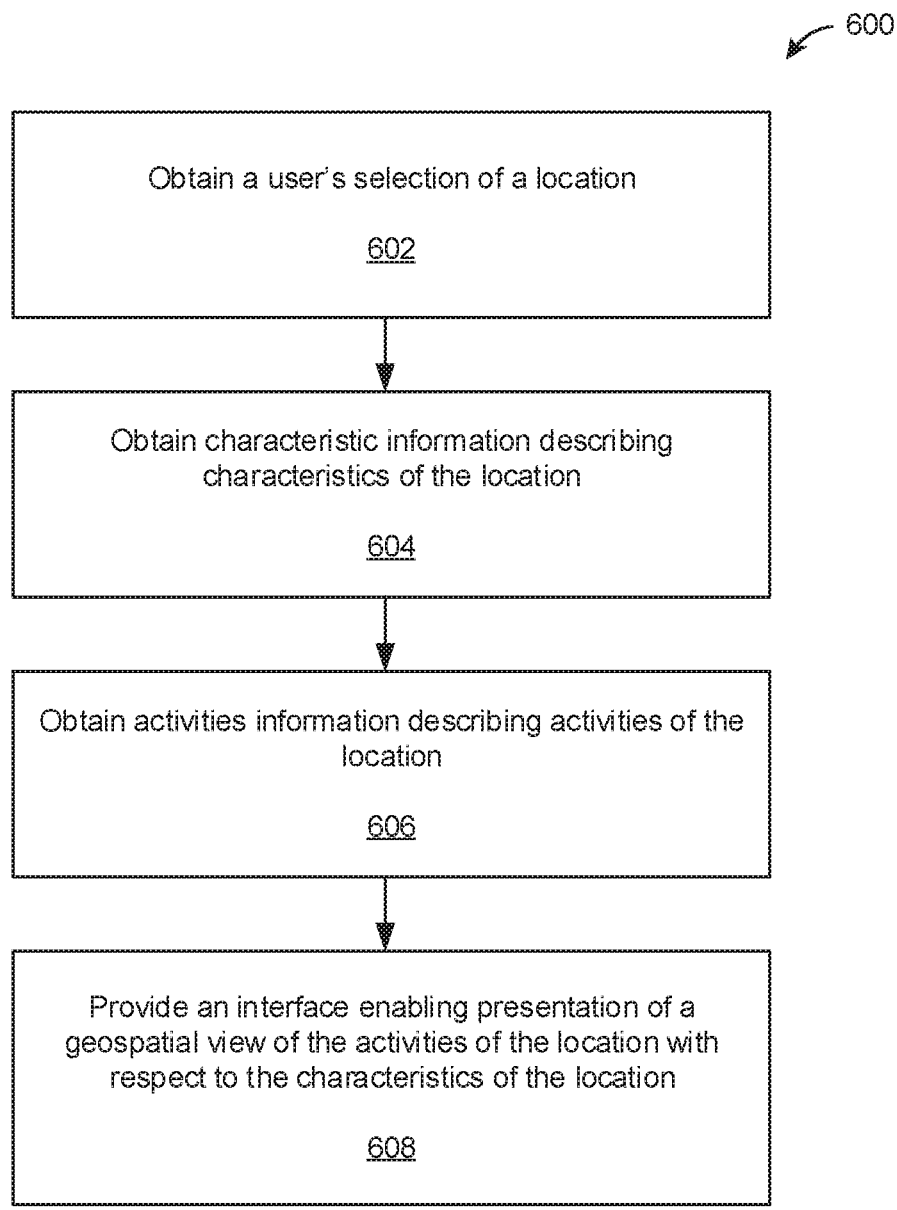
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, a user's election of a location may be obtained. At block 604, characteristic information describing characteristics of the location may be obtained. At block 606, activities information describing activities of the location may obtained. At block 608, an interface may be provided. The interface may enable presentation of a geospatial view of the activities of the location with respect to the characteristics of the location.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
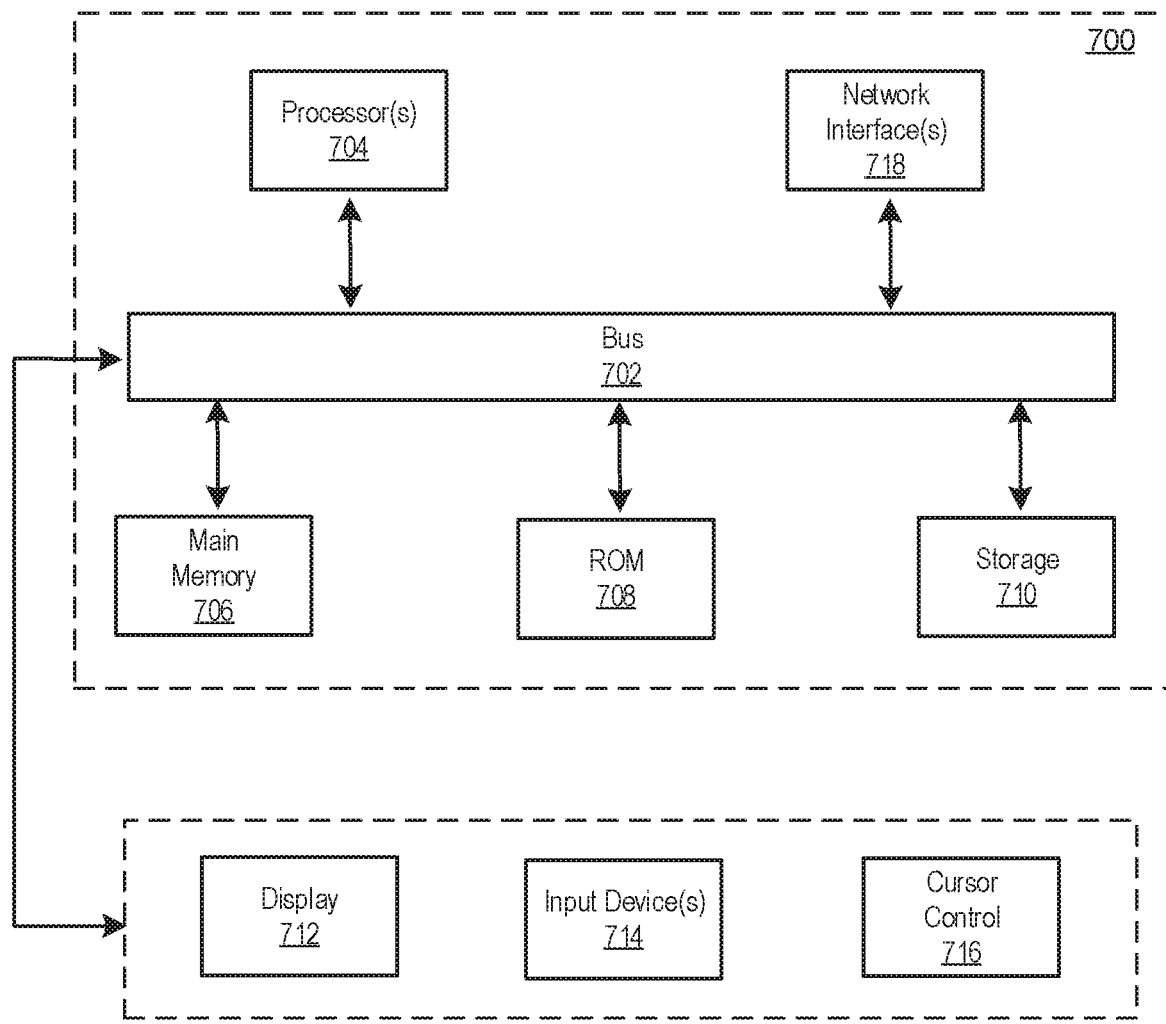
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining a selection of a location;
obtaining characteristic information describing characteristics of the location;
obtaining activities information describing current activities and future or recurring activities scheduled or predicted to physically occur at the location within a specified time duration of a current time, wherein at least a subset of the characteristic information or the activities information comprises unstructured text;
providing an interface, wherein the interface enables presentation of a geospatial view of the activities information with respect to the characteristics of the location, and a textual description related to the characteristic information or the activities information, wherein the providing of the interface comprises changing a format of at least the subset of the characteristic information or the activities information; and
updating the interface over time to continuously simulate, prior to the future activities or prior to a future occurrence of the recurring activities, the future or recurring activities scheduled or predicted to physically occur at the location.

2. The system of claim 1, wherein the activities information is updated dynamically to obtain, at a first time instance, the activities information within the specified time duration of a first time instance and obtain, at a second time instance, the activities information within the specified time duration of the second time instance.

3. The system of claim 1, wherein the interface comprises a document section that comprises one or more narratives of the activities information, an overview section that comprises metadata of the narratives and a map view, and a tag section that comprises entities which have been tagged.

4. The system of claim 3, wherein the instructions further cause the system to perform, upon receiving an update to an entity to be tagged, highlighting any instance of the entity within the document section.

5. The system of claim 3, wherein the instructions further cause the system to perform, upon receiving a removal of an entity to be tagged, removing any highlighted instance of the entity within the document section.

6. The system of claim 1, wherein the instructions further cause the system to perform, importing one or more external media files from an external data source and augmenting the map view with the one or more external media files.

7. The system of claim 3, wherein the instructions further cause the system to perform, updating the one or more narratives of the activities information with a passage of time, such that a first narrative of the activities information is populated at a first time instance to include activities information that will occur within the specified time duration of the first time instance and a second narrative of the activities information is populated at a second time instance to include activities information that will occur within the specified time duration of the second time instance.

8. The system of claim 1, wherein the obtaining of the activities information comprises transmitting a search request to multiple databases and multiple search engines and aggregating multiple files responsive to the search request.

9. The system of claim 1, wherein the simulating of the future or recurring activities comprises simulating future recurring activities.

10. The system of claim 1, wherein the location comprises a range of locations enclosed within one or more boundaries; and the instructions that, when executed by the one or more processors, cause the system to perform:
receiving an updated selection of the one or more boundaries;
automatically updating the textual description based on the updated selection, wherein the interface comprises multiple windows corresponding to the textual description; and the updating the textual description based on the updated selection comprises updating corresponding text within the multiple windows.

11. A method implemented by a computing system including one or more processors and storage media storing machine-readable instructions, wherein the method is performed using the one or more processors, the method comprising:
obtaining a selection of a location;
obtaining characteristic information describing characteristics of the location;
obtaining activities information describing current activities and future or recurring activities scheduled or predicted to physically occur at the location within a specified time duration of a current time, wherein at least a subset of the characteristic information or the activities information comprises unstructured text;
providing an interface, wherein the interface enables presentation of a geospatial view of the activities information with respect to the characteristics of the location, and a textual description related to the characteristic information or the activities information, wherein the providing of the interface comprises changing a format of at least the subset of the characteristic information or the activities information; and
updating the interface over time to continuously simulate, prior to the future activities or prior to a future occurrence of the recurring activities, the future or recurring activities scheduled or predicted to physically occur at the location.

12. The method of claim 11, wherein the activities information is updated dynamically to obtain, at a first time instance, the activities information within the specified time duration of a first time instance and obtain, at a second time instance, the activities information within the specified time duration of the second time instance.

13. The method of claim 11, further comprising populating, at the interface, a document section that comprises one or more narratives of the activities information, an overview section that comprises metadata of the narratives and a map view, and a tag section that comprises entities which have been tagged.

14. The method of claim 13, further comprising:
upon receiving an update to an entity to be tagged, highlighting any instance of the entity within the document section.

15. The method of claim 13, further comprising:
upon receiving a removal of an entity to be tagged, removing any highlighted instance of the entity within the document section.

16. The method of claim 11, further comprising:
importing one or more external media files from an external data source and augmenting the map view with the one or more external media files.

17. The method of claim 13, further comprising:
updating the one or more narratives of the activities information with a passage of time, such that a first narrative of the activities information is populated at a first time instance to include activities information that will occur within the specified time duration of the first time instance and a second narrative of the activities information is populated at a second time instance to include activities information that will occur within the specified time duration of the second time instance.

18. A non-transitory computer readable medium comprising instructions that, when executed, cause one or more processors to perform:
obtaining a selection of a location;
obtaining characteristic information describing characteristics of the location;
obtaining activities information describing current activities and future or recurring activities scheduled or predicted to physically occur at the location within a specified time duration of a current time, wherein at least a subset of the characteristic information or the activities information comprises unstructured text;
providing an interface, wherein the interface enables presentation of a geospatial view of the activities information with respect to the characteristics of the location, and a textual description related to the characteristic information or the activities information, wherein the providing of the interface comprises changing a format of at least the subset of the characteristic information or the activities information; and
updating the interface over time to continuously simulate, prior to the future activities or prior to a future occurrence of the recurring activities, the future or recurring activities scheduled or predicted to physically occur at the location.

19. The non-transitory computer readable medium of claim 18, wherein the activities information is updated dynamically to obtain, at a first time instance, the activities information within the specified time duration of a first time instance and obtain, at a second time instance, the activities information within the specified time duration of the second time instance.

20. The non-transitory computer readable medium of claim 18, wherein the interface comprises a document section that comprises one or more narratives of the activities information, an overview section that comprises metadata of the narratives and a map view, and a tag section that comprises entities which have been tagged.

* * * * *